United States Patent [19]

Wittke

[11] Patent Number: 4,761,743

[45] Date of Patent: Aug. 2, 1988

[54] DYNAMIC SYSTEM ANALYSIS IN A VIBRATING BEAM ACCELEROMETER

[75] Inventor: Ernest C. Wittke, West Caldwell, N.J.

[73] Assignee: The Singer Company, Stamford, Conn.

[21] Appl. No.: 803,155

[22] Filed: Dec. 2, 1985

[51] Int. Cl.[4] ............................................. G01P 9/04
[52] U.S. Cl. ........................ 364/484; 73/517 AV; 73/505; 73/510; 328/193; 328/144
[58] Field of Search .............. 364/484, 485, 715, 718; 328/133, 144, 145, 193; 324/78 R, 79 R; 73/655, 657, 517 AV, 505, 510

[56] References Cited

U.S. PATENT DOCUMENTS

| | | | |
|---|---|---|---|
| 3,505,866 | 4/1970 | Weisbord et al. | 73/141 |
| 3,681,689 | 8/1972 | Correard et al. | 324/78 R |
| 4,104,920 | 8/1978 | Albert et al. | 73/517 AV |
| 4,155,257 | 5/1979 | Wittke | 73/497 |
| 4,221,131 | 9/1980 | Albert | 73/517 AV |
| 4,423,519 | 12/1983 | Bennett, Jr. et al. | 329/145 |
| 4,445,065 | 4/1984 | Albert | 310/323 |
| 4,445,376 | 5/1984 | Merhav | 73/510 |
| 4,446,394 | 5/1984 | Albert | 310/321 |
| 4,485,448 | 11/1984 | Kurth | 364/484 |
| 4,590,801 | 5/1986 | Merhav | 73/510 |
| 4,628,735 | 12/1986 | Kirkpatrick | 73/517 AV |
| 4,712,427 | 12/1987 | Peters | 73/517 AV |

FOREIGN PATENT DOCUMENTS 0834697  5/1981  U.S.S.R. .............................. 364/484

Primary Examiner—Parshotam S. Lall
Assistant Examiner—V. N. Trans
Attorney, Agent, or Firm—David L. Davis

[57] ABSTRACT

A method and apparatus for measuring a dynamic effect applied to a vibrating beam accelerometer. The apparatus analyzes a pair of frequencies related to natural frequency as a function of a force applied to a vibrating beam accelerometer producing $f_1$ and $f_2$; $(f_1^2 - f_2^2)$ is computed to approximate $$\int_{t1}^{t2} (\Sigma f \cdot \Delta f).$$

26 Claims, 5 Drawing Sheets

FIG.2A  FIG.2B

| FIG. 2A | FIG. 2B |

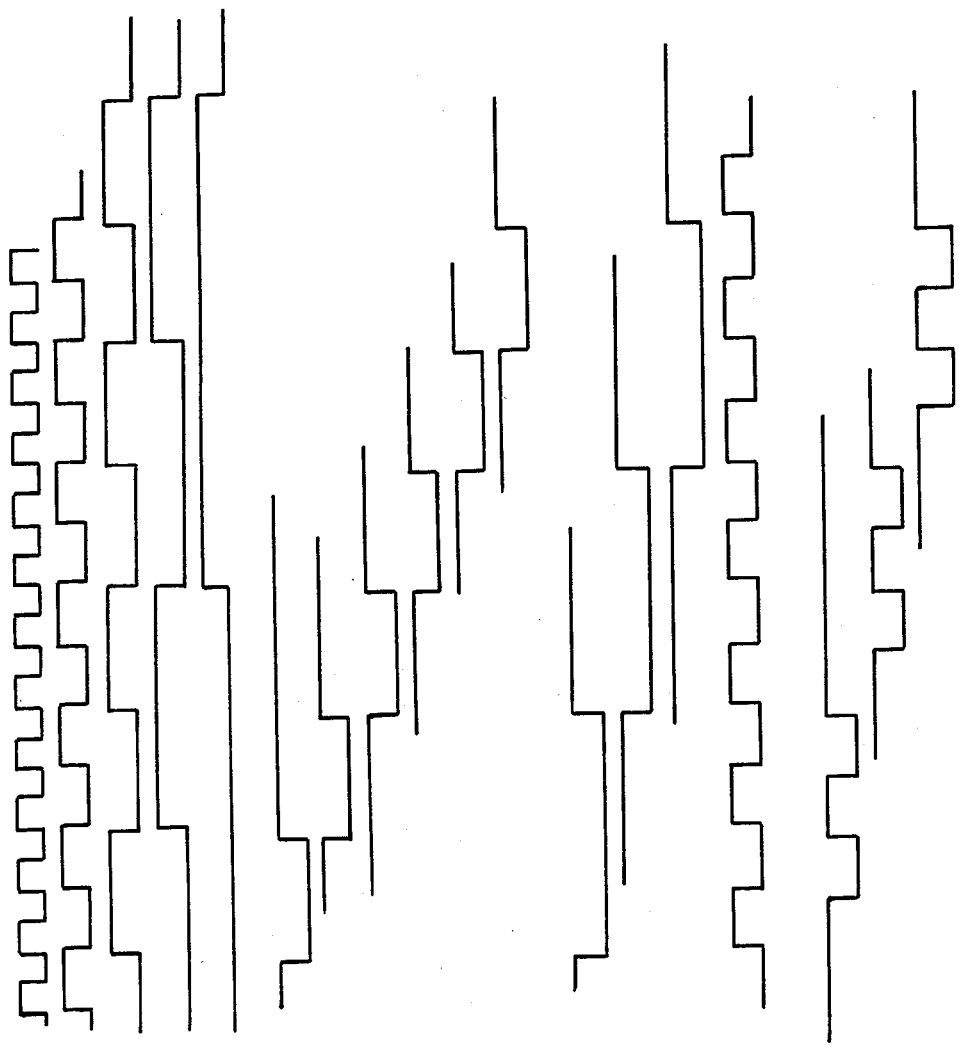

DYNAMIC SYSTEM ANALYSIS IN A VIBRATING BEAM ACCELEROMETER

BACKGROUND OF THE INVENTION

1. Field of Invention

The present invention relates to circuitry for analyzing a dynamic system and more particularly to the application of this circuitry to a vibrating beam accelerometer ("VBA"). The circuitry analyzes a pair of frequencies which are related to natural frequency as a function of a force applied to a VBA to approximate $$\int_{t1}^{t2} (\Sigma f \cdot \Delta f) dt$$

2. Description of the Related Art

The term "system" is defined as an assemblage of objects united by some form of interaction or interdependence. For a dynamic system, there is the added restriction that the interaction or interdependence will vary with time. This dynamic behavior has been characterized by observing certain relationships, including the relationship between frequency and natural frequency:

$$W = W_n(1+KT)^{\frac{1}{2}} \quad (1)$$

where W is a frequency, $W_n$ is a natural frequency, K is a constant, and T is a force, for example, the tension of a vibrating beam. The characterization of the variables are typical in the mechanical engineering arts. The equation has been applied to a wide range of dynamic systems, and a basic description of this phenomenon can be found in Norman H. Beachley and Howard L. Harrison, Introduction to Dynamic Systems (1978). As applied in a VBA, the difference in two frequencies is used to compute T, which is then used to calculate acceleration and velocity. For example, acceleration may be defined as being equal to the constant K times the difference in two frequencies ($W_1 - W_2$).

In designing circuitry to analyze the relationships in equation 1, a fundamental problem has been the non-linear nature of the equation. It has always been assumed that the effects of this non-linearity could be overcome by using a computer to make linear calculations and then to compensate for the error caused by the non-linearity. However, the presence of high levels of vibration produces a strong bias which normally makes computer compensation difficult and unreliable. This is true because the bias is determined by the harmonic content of the vibration and computer iteration is slow compared to higher vibration frequencies.

In practical applications such as a VBA, the presence of very high levels of vibration, severe acceleration and the non-linearity causes a large static error in the acceleration output. This acceleration error cannot be reduced by computer correction for cases where the vibration frequency is greater than one-half the computer sampling frequency. If the vibration level is separately observed and its wave-shape is known, correction is possible. However, this approach would appear to require the use of a plurality of additional accelerometers for sensing. Thus, the applications of such dynamic system analysis circuitry have been severely limited.

SUMMARY OF THE INVENTION

It is an object of the present invention to provide an apparatus and a method for more accurately analyzing the above relationships.

It is another object of the present invention to provide an apparatus and method for linearizing the above relationships.

It is a further object of the present invention to reduce the amount of error which occurs in such analysis, particularly cyclical error.

It is yet another object of the present invention to apply such an apparatus and method in a VBA.

Other objects and advantages of the present invention will become apparent from the following summary, drawings and detailed description of the invention and its preferred embodiment.

Although the application of this circuitry is considerably broader than its use in a VBA, this application is used to teach a best mode and manner of implementing of the invention.

A VBA is comprised of two beams. Each beam is located between a mounting and, typically, a pendulous mass. The beams are oriented in opposing directions. The beams are comprised of a piezo electric material, for example quartz, which produces a mechanical stress when subjected to a voltage. A voltage is pulsed to each quartz beam to produce an oscillation. Moving the VBA in a direction corresponding to the length of the beams affects the pendulous mass, causing a change in the oscillations. These changes are measured and used to compute acceleration.

As to general applications involving equation 1, the threshold problem is to linearize a relationship which is typically analyzed as a non-linear problem. By squaring equation (1) and analyzing two frequencies $W_1$ and $W_2$ corresponding to the two beams with $K_1$ and $K_2$ constants that reflect the opposing orientations, there are the following equations:

$$W_1^2 = W_{1n}^2(1+K_1T) \quad (2)$$

$$W_2^2 = W_{1n}^2(1-K_2T) \quad (3)$$

These equations can be combined to determine the force T as the difference between the squares of the frequencies.

$$W_1^2 - W_2^2 = W_{1n}^2 K_1 T - W_{2n}^2 + W_{2n}^2 K_2 T \quad (4)$$

$$= (W_{1n}^2 - W_{2n}^2) + (W_{1n}^2 K_1 + W_{2n}^2 K_2)T \quad (5)$$

This equation can be simplified and put into a format for determining force T from the change in frequencies.

$$W_1^2 - W_2^2 = A + BT \quad (6)$$

Solving for force T, there is $$[(W_1^2 - W_2^2)/B] + [-A/B] = T \quad (7)$$

Though not rigorously true as a linear equation, in most applications, the relationship is sufficiently linearized to allow the relationship to be implemented in circuitry. In equation (7), the $[(W_1^2 - W_2^2)/B]$ term may be represented in a binomial expansion. The $[-A/B]$ term indicates the bias because quantity B is a scale factor and quantity A is a bias.

More specifically, to apply this approach in a VBA, the present invention can be understood as observing that the VBA is a linear instrument in terms of the product of the sum and difference frequency rather than the difference frequency currently employed in the prior art. The VBA frequency output is analyzed by detecting, either separately or in combination, the phase changes resulting from these frequencies in a fixed time interval. Since phase is the time integral of frequency, the output data provides a quasi-function of the time integral of accelleration, or a quasi-velocity. In terms of conventional instrumentation, the VBA is capable of providing as its outputs:

$$\int_{t1}^{t2} f_1 dt; \tag{8}$$

$$\int_{t1}^{t2} f_2 dt; \tag{9}$$

$$\int_{t1}^{t2} (f_1 - f_2) dt; \tag{10}$$

$$\int_{t1}^{t2} (f_1 + f_2) dt \tag{11}$$

where f is frequency and the particular characterizations of the variables are typical of electrical engineering arts. Essentially, though, f corresponds to W in equation (1), etc.

Because only two independent data items are provided, any two of the above outputs completely define all four of the above outputs. Thus, the following outputs will be considered to be the integral of the sum frequency and the integral of the difference frequency:

$$\int_{t1}^{t2} \Sigma f dt; \tag{12}$$

$$\int_{t1}^{t2} \Delta f dt \tag{13}$$

Because a VBA is linear in terms of the product of the sum and difference frequencies, what is desired is an output:

$$\int_{t1}^{t2} (\Sigma f \cdot \Delta f) dt \tag{14}$$

Unfortunately, it is impossible to evaluate this integral based upon the available integrals of the sum and difference frequencies under conditions where f and $\Delta f$, respectively, are a function of time.

$$\int_{t1}^{t2} (\Sigma f \cdot \Delta f) dt \neq f \left( \int_{t1}^{t2} \Delta f dt, \int_{t1}^{t2} \Sigma f dt \right) \tag{15}$$

The only way in which the required integral can be evaluated is by multiplying $\Delta f$ and $\Sigma f$ together prior to integration.

It would be ideal if an analog means existed for directly multiplying two frequencies, similar to the means (mixer) which is used to add or subtract two frequencies. However, it will suffice to evaluate $\Delta f$ and $\Sigma f$ at rates sufficiently above the highest frequency of vibration so that it may be assumed that $\Delta f$ and $\Sigma f$ are constant for the sampling frequency. In this case, the following relationship will hold to sufficient accuracy.

$$\int_{t1}^{t2} \Delta f \cdot \Sigma f dt \approx \Delta f \cdot \Sigma f \int_{t1}^{t2} dt \tag{16}$$

It is assumed that if the evaluation rate is higher than the Nyquist frequency for the highest vibration component, accurate results will be achieved.

Placing this VBA application in general perspective:

$$f = (f_1 - f_2) \cdot (f_1 + f_2) \tag{17}$$

$$f = f_1^2 - f_2^2 = A + BT \tag{18}$$

because W=f in equation (6).

The present invention may be implemented in a VBA by determining the individual beam frequencies, dividing each cycle into portions by means of a phase locked loop and determining the number of portions of a cycle which occur in a fixed time interval, as a digital number. The resultant digital number is squared in a digital multiplier and the squared numbers from the two beams are subtracted to provide the output. Roundoff loss occurring in the digitization process are added to the next sample of data, to ensure that there is no cumulative error.

BRIEF DESCRIPTION OF THE DRAWINGS

FIG. 3 is a timing diagram.

DETAILED DESCRIPTION OF THE INVENTION AND ITS PREFERRED EMBODIMENT

The present invention is disclosed in the context of a three axis system, i.e., X, Y and Z axes. For each axis there are then two vibrating beams.

Figure 4:
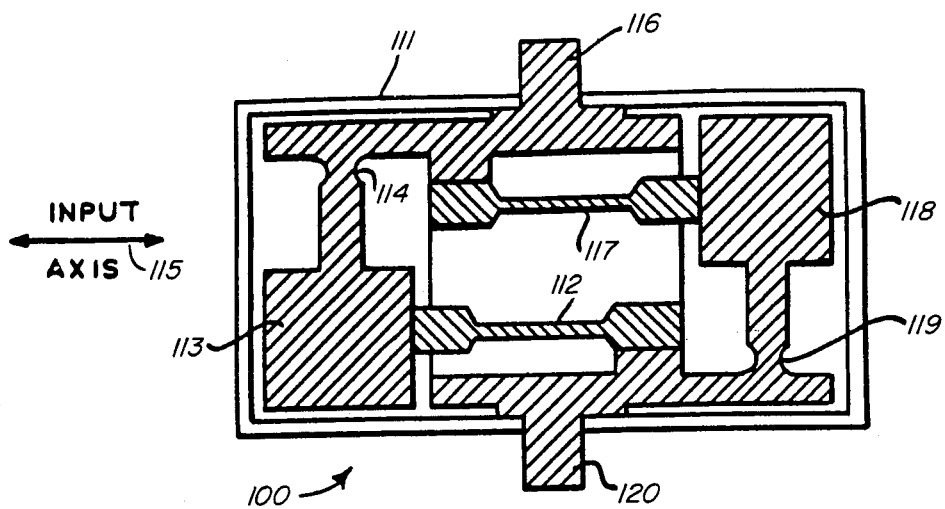
FIG. 4 is a schematic representation of a conventional two-beam single axis vibrating beam accelerometer.

Referring to FIG. 4, there is shown a conventional prior art vibrating beam accelerometer 100 which is housed in an enclosure 111. Within the enclosure 111, therre are two independent vibrating beam transducers 112 and 117 mounted in opposition to each other to achieve symmetry and to permit cancellation of first order errors. A first section of the accelerometer comprises the quartz crystal beam 112 and the pendulous mass 113 supported for movement about flexure hinge 114 which in turn is connected to the mounting surface 116. A second section of the accelerometer comprises the quartz crystal beam 117 and the pendulous mass 118 supported for movement about flexure hinge 119 which in turn is connected to the mounting surface 120. Each pendulous mass is driven by its related quartz crystal beam which is attached to the mass and perpendicular to the pendulum rod axis.

The opposite sides of the quartz crystal beams 112 and 117 are plated with an electrically conductive coating (not shown) and are excited by an AC voltage. The piezoelectric nature of quartz causes it to deflect as a beam under the influence of the applied voltage. At the resonant frequency of the beam as an end supported beam, the electrical impedance between the coated surfaces falls sharply, allowing the beam to be used as one leg of a frequency sensing electrical bridge, the output of which is the input signal to the amplifier driving the bridge, causing the beam-amplifier system to oscillate at the beam resonant frequency.

Applying acceleration to the pendulous masses 113 and 118 along the input axis 115 causes the resonant frequency to increase (under tension) or decrease (under compression). Since the two sections of the accelerometer are oriented in opposite directions, acceleration causes one beam to be under compression and the other beam to be under tension, resulting in a decrease of frequency of one oscillator and an increase in frequency of the other oscillator. The difference in the frequency of the two oscillators is a measurement of the applied acceleration.

Figure 1:
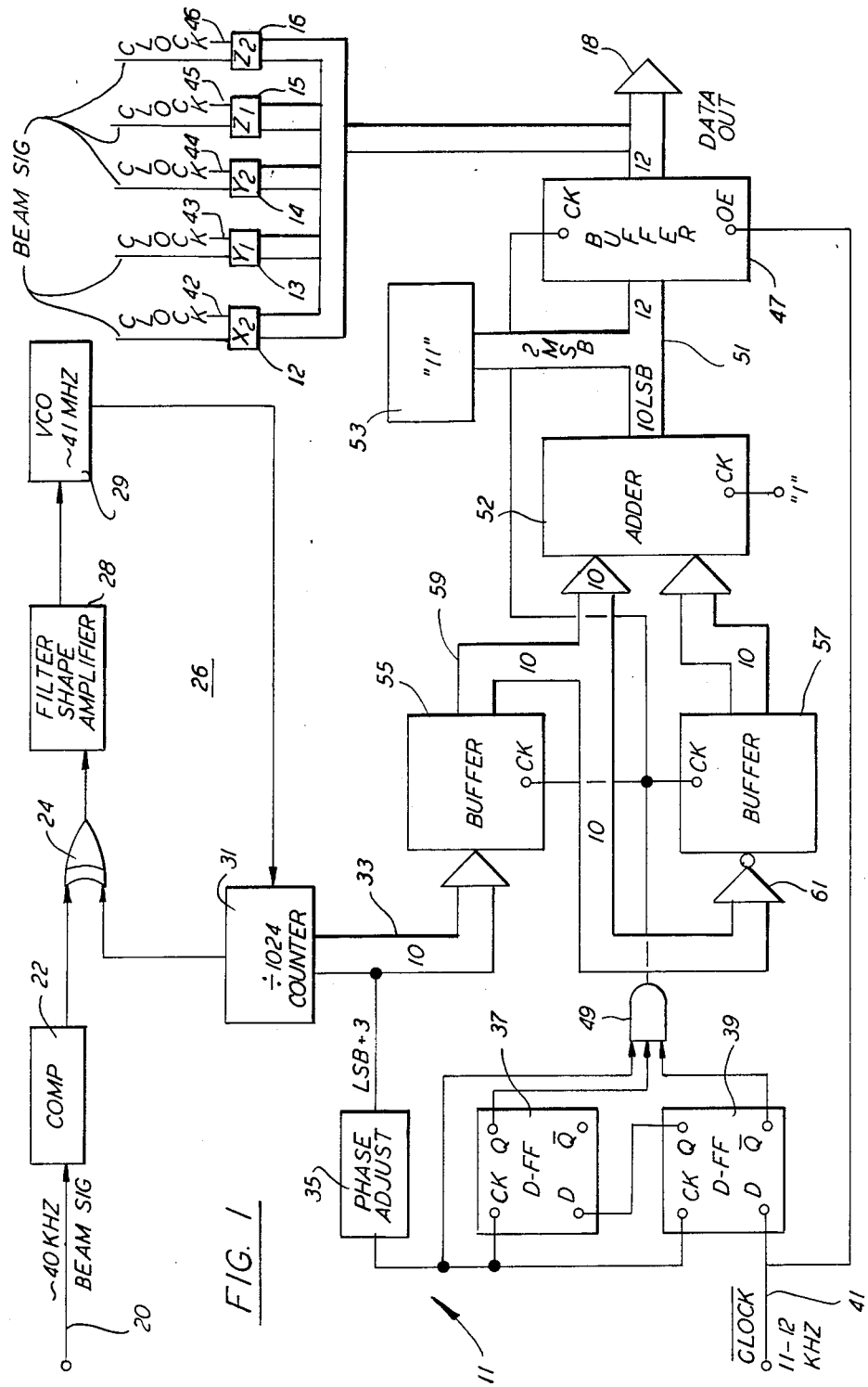
FIG. 1 is a circuit block diagram of a phase counter for a VBA.

FIG. 1 illustrates a phase counter circuit 11 for one of the vibrating beams. Identical circuits designated 12–16 are provided for the other five beams. The outputs of all of these circuits are coupled onto a data bus 18. With reference to the phase counter circuit 11, the incoming beam signal which is at about 40 kHz on line 20 is provided as an input to a comparator 22 which converts the sine wave signal on line 20 into a square wave. The square wave is an input to an exclusive OR gate 24 forming part of a conventional phase locked loop 26. In conventional fashion, the phase locked loop also includes a filter and shaping amplifier 28, a voltage controlled oscillator 29, having a center frequency of approximately 41 MHz and a divide by 1024 counter 31 which divides the output of the VCO down to a frequency equal to the frequency of the incoming beam signal. The output of counter 31 is provided on a 10-bit bus 33.

The least significant bit plus 3 from the 10-bit bus 33 is provided to a phase adjust circuit 35 which may be an adjustable pulse delay circuit of conventional design which permits trimming. This signal at about 2.5 MHz is the clock input to a D-type flip-flop 37 and to a D-type flip-flop 39. The D input of flip-flop 39 is obtained from a clock signal on line 41. The manner in which the clock signal is obtained will be described below. However, in general, the clock signal on line 41 and similar signals (on lines 42–46 of FIG. 2) for the other beams occur in sequence to couple one signal at a time onto bus 18. Thus, the clock signal is also coupled as an output and enable signal to a buffer 47 coupled to the output data bus 18. As a result, data from the buffer 47 is coupled onto the output bus during the time when the clock signal for that particular beam is present. The Q output of flip-flop 39 is coupled as the $\overline{D}$ input to flip-flop 37. The Q output of flip-flop 37, the $\overline{Q}$ output of flip-flop 39 and the output of phase adjust circuit 35 are inputs to AND gate 49. The output of AND gate 49 is the clock input to buffer 47 and will cause to be loaded into the buffer what is present on its input data bus 51. The purpose of the flip-flops 37, 39 and AND gate 49 are to synchronize the clock signal on line 41 and the output of the counter 31.

The clock signal on line 41 is normally high. When the clock signal goes low, this low signal or logic "0" is transferred to the Q output on the next output from the phase adjust circuit 35. Prior to the occurrence of the pulse out of phase adjust circuit 35, the Q output of flip-flop 39 was high and present at the D input of flip-flop 37. Thus, on the clock pulse, the Q output of flip-flop 37 becomes or remains a logic "1", the $\overline{Q}$ output of flip-flop 39 becomes a logic "1." Since the output of the phase adjust circuit 35 is still present, there are three "1" inputs to AND gate 49 and it will output a pulse to clock the data into the buffer 47.

The data into buffer 47 comprises the output of an adder 52 which provides the ten least significant bits. The two most significant bits provided to buffer 47 are from a constant source 53. Although this is indicated as a separate block, this may be accomplished simply by tying the two lines to the logic supply. The adder 52 has as inputs the outputs of buffers 55 and 57. Buffer 55 obtains its input from bus 33 from counter 31. The output of buffer 55 is a bus 59 which, after being inverted through an inverter 61, is the input to buffer 57. Buffers 55 and 57 also have their clock lines coupled to the output of gate 49. Thus, on each clock pulse out of gate 49 the value then in the counter 31 is loaded into buffer 55. The inverted value of the previous count is loaded into buffer 57. These two quantities are added at adder 52 and the output appears on bus 52. This result is clocked into the buffer 47. On the next clock pulse on line 41, the output of buffer 47 containing this information is provided onto the output bus 18.

The output of the adder 52, because it is the sum of the present count and the previous count inverted, is a difference and is equal to the number of counts between two clock pulses.

By selecting the clock on line 41 at 11 kHz to 12 kHz, it is ensured that between clock pulses, there will be somewhere between 3 and 4 cycles of beam frequency. Since measuring components will always be between 3 and 4 cycles of beam frequency in the designated period, it is possible to set the first two most significant bits equal to "1's" at source 53. Thus, the output on bus 18 is a signal representative of the frequency of the beam.

Figures 2, 2B:
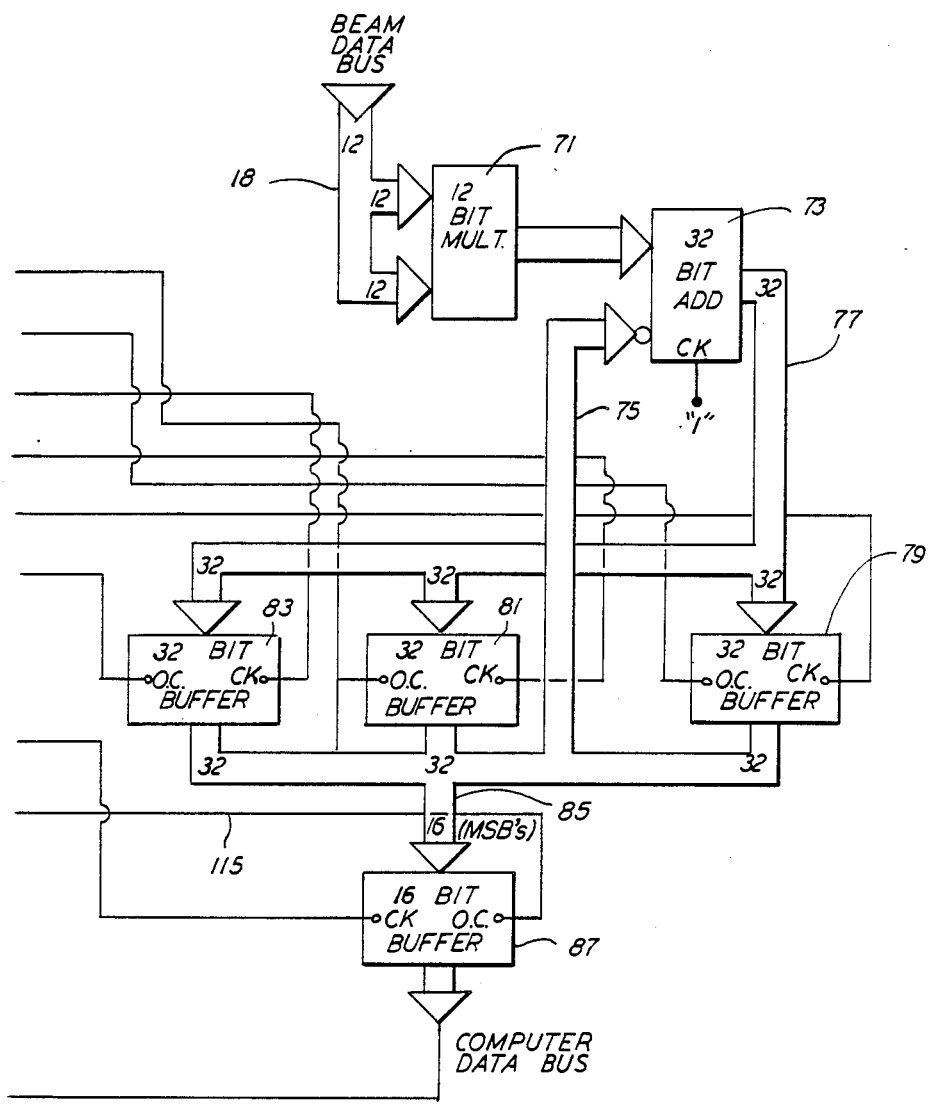
FIG. 2 is control circuitry for a linearized VBA.
Figure 2A:
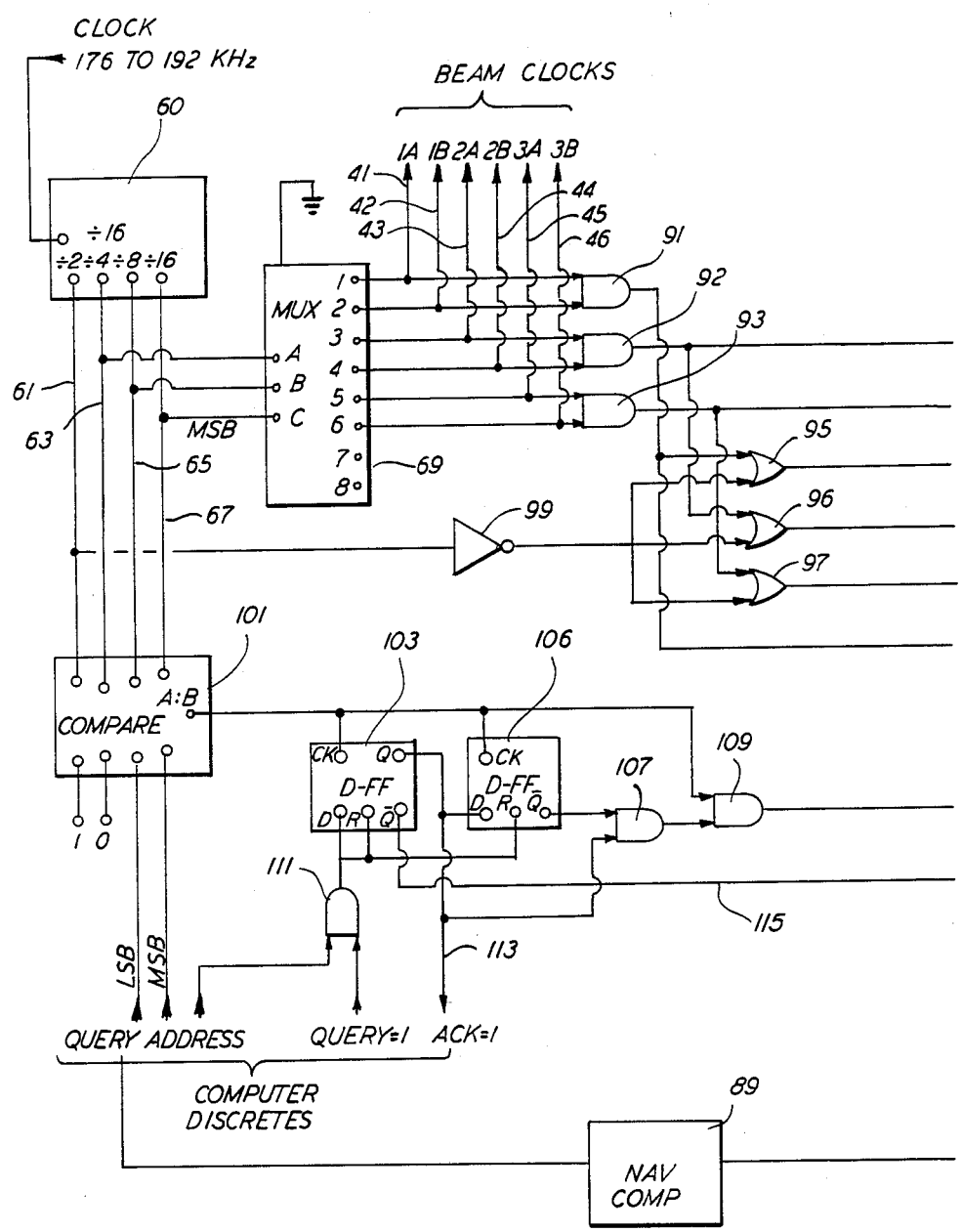

Referring to FIG. 2, which is a block diagram and FIG. 3, which is a timing diagram, the generation of the clock signal on line 41, and on lines 42 to 46, will be seen. A clock operating in the range cf 176 kHz to 192 kHz is divided in a divide by 16 counter 60. Thus, assuming a 192 kHz input frequency, the output on line 61 will be at 96 Hz, that on line 63 at 48 kHz, that on line 65 at 24 kHz and that on line 67 at 12 kHz. Lines 63, 65 and 67 are inputs to a multiplexer 69 and can select one out of eight outputs which, when selected will become a logical "0". Thus, the outputs indicated as MUX1-6 on the timing diagram are provided as outputs. These then are the clock signals on lines 41–46 which sequentially cause the outputs of the associated buffers to be put on the data bus 18.

The data bus 18 is coupled as the two inputs to a 12-bit multiplier 71 and thus, the output of this multiplier will be the selected input frequency squared. On the first input cycle, it will be the frequency of the first beam for the first axis squared. This output is provided to a 32-bit adder 73 which receives a second, inverted input from bus 75. The output of the adder 73, is thus the difference between its inputs. The output of adder 73 is provided to a bus 77. It is coupled as an input to three 32-bit buffers 79, 81 and 83, one for each of the sixteen most significant bits of three axes. The output, from these buffers are provided to a bus 85 which is the input to a 16-bit buffer 87, the output of which is coupled to the navigation computer 89 with which the accelerometers are associated.

The outputs of the multiplexer 69 are also provided as inputs to AND gates 91, 92 and 93. The first two outputs are outputs to AND gate 91, the second two outputs are inputs to AND gate 92, and last two outputs inputs to AND gate 93. The result of this ANDing operation, is that the AND gates are normally high and go low during the two cycles associated with the one axis. The outputs of AND gates 91, 92 and 93 are inputs to OR gates 95, 96 and 97, respectively, these gates having as their second input the output on line 61, i.e., the output at 96 kHz inverted through an inverter 99. As illustrated on the timing diagram, this results in two pulses during the enablement period of each of the three axes. These are provided as clock pulses to the buffers 79-83.

Also provided is a comparator 101 which has as inputs the outputs of the divide by 16 counter 60. The other side of the comparator 101 has an input from the navigation computer 89 and for the two least significant bits a constant "1" and "0". The navigation computer 89 when it desires an output for one of the axes places on the other two bits an address corresponding to the desired axis. The output of the comparator 101 clocks flip-flops 103 and 106, the outputs of which are ANDed in gate 107, the output of which is ANDed with the clock signal in gate 109 to synchronize an input from the computer which is obtained by ANDing an enable signal and a query signal in AND gate 111. The operation of this synchronizer is exactly like the operation of the synchronizer made up of flip-flops 37 and 39, and gate 49 discussed above. The Q output of flip-flop 103 also forms an acknowledge signal on line 113 which is fed back to the computer. The $\overline{Q}$ output of flip-flop 103 on line 115 is the output control input to the buffer 87. The output of AND gate 109 is the clock input to the buffer 87. The outputs of AND gates 91, 92 and 93 are the output controls for buffers 83, 81 and 79, respectively.

Thus, during the first two outputs from multiplexer 69, corresponding to the selection of the two beams for the first axis, the output of buffer 83 is enabled. Similarly in sequence, buffers 81 and 79 are enabled. By properly addressing and through the comparator 101, the navigation computer can then select to have clocked into the output buffer 87 the output of one of the buffers 79 to 83. The buffer 87 is then controlled such that its output is provided to the computer.

The data stored in the buffers 79 to 83 corresponds to the quantity $f_1^2-f_2^2$. The first time data is input from the first beam of the first axis, when there is nothing to subtract from it, this value is transferred to its associated buffer 83, on the first of the pair of clock pulses from this OR gate 95. Now the second beam for that same axis is selected, and its frequency is squared in the multiplier 71. Now, since the output of the buffer 83 is enabled, the previous value of $f_1^2$ is fed back and the output of the adder 73 is the difference between $f_1^2$ and $f_2^2$. This difference then is loaded back into the buffer 83. The same thing happens for the other two axes, and these results are stored in buffers 81 and 79.

The next time it is time to do computations for the first axis, once again the value $f_1$ is squared and subtracted from it is the value stored in the buffer. This value then is $f_{12}^2-(f_{21}^2-f_{11}^2)$ where the second subscript designates the sample number. The next time, the value $f_{22}$ is squared and subtracted from it is the value in the buffer. This gives $(f_{22}^2-f_{12}^2+f_{21}^2-f_{11}^2)$. The result is $f_{22}$ minus $f_{12}$ plus $f_{12}$ minus $f_{11}$. Thus, the integrating operation is performed in the apparatus.

Although basically, the relationship between beam frequency and acceleration is a second order function, there may be higher order terms. Such terms can be processed adding additional stages of multiplication and addition as necessary. Furthermore, any scaling and bias computations (i.e., referring to equation 7 above, in which the quantity B is a scale factor and the quantity A is a bias) will involve known quantities which can be compensated in the navigation computer.

The purpose of the circuitry in FIGS. 1 and 2 is to allow the VBA to be linearized at a rate sufficiently high as to render it immune from vibration biases produced by intermodulation distortion. The circuitry meets this requirement in that it is inherently linear. It achieves this linearity at the expense of a cyclical resolution error resulting from the squaring process.

For a precisely known reference clock frequency, the roundoff error should be predictable and will be a repeating cycle. Both the vibration and electronic noise in the individual beam signals are expected to be larger than the individual bit resolution of the phase locked loop. This noise will have the effect of averaging the resolution error. The RMS error might be expected to be reduced in proportion to the number of bits over which vibration and electronic noise affects the operation of the phase locked loop.

What is claimed is:

1. Apparatus for analyzing a pair of frequencies which are related to natural frequency as a function of a force applied to a system, said system including means producing a first frequency ($f_1$) and a second frequency ($f_2$) comprising:
    means for sensing said first frequency ($f_1$) and said second frequency ($f_2$);
    means for squaring said first and second frequencies to produce $f_1^2$ and $f_2^2$ respectively;
    means for computing the difference between said squared frequencies ($f_1^2-f_2^2$) to approximate $$\int_{t1}^{t2} (\Sigma f \cdot \Delta f) dt$$

to obtain a measure of the force applied to the system, including means for scaling and biasing $(f_1^2-f_2^2)$ in accordance with the relationship of $[(f_1^2-f_2^2)/B]+[(-A/B)]$, where A is said bias, and B is said scale factor;
    said means producing said first and said second frequencies comprising:
    a first mass and a second mass, respectively;
    means for vibrating said masses at said first and said second frequencies; and
    means for orienting said masses such that moving said means for producing said frequencies will cause an increase in one said frequency and a decrease in said other said frequency.

2. The apparatus of claim 1, wherein said means for sensing said first frequency and said means for sensing said second frequency each comprise:
    a phase counter-circuit for producing a count of the number of phase cycles in said frequency which occur within a specified time.

3. The apparatus of claim 2, wherein said means for squaring said frequencies, together with said means for computing said difference between said squared frequencies, comprises:

a control circuit for receiving said count from each phase counter-circuit, for squaring each said count and for subtracting said first squared count from said second squared count to produce said difference between said squared frequencies.

4. The apparatus of claim 3, wherein each said phase counter-circuit comprises:
a comparator for converting said frequency into square waves;
a phase locked loop for counting square waves and outputting an initial count signal and a subsequent count signal, said phase locked loop comprising: and exclusive OR gate, a filter and shaping amplifier, a voltage controlled oscillator and a divide by 1024 counter;
a synchronizing circuit for coordinating clock signals with said count signals;
means for determining the difference between said initial count and said subsequent count, to produce said count.

5. The apparatus of claim 4, wherein said difference between said squared frequencies $f(_1^2 - f_2^2)$ is computed at a rate of at least the Nyquist frequency for the highest vibration of said means producing said frequencies.

6. The apparatus of claim 5, wherein the means producing said first and said second frequencies is a vibrating beam accelerometer.

7. The apparatus of claim 6, further comprising:
two additional of the apparatus of claim 6, the three sets of apparatus for performing X axis, Y axis and Z axis analysis, and
said accelerometers are aligned to produce signals corresponding to movement along the X, Y and Z axes.

8. The apparatus of claim 7 wherein said control circuit comprises:
a multiplier for squaring said count;
an adder for combining said squared count from one beam of said vibrating beam accelerometer with the inverse of said squared count from a second beam of said vibrating beam accelerometer, for each vibrating beam accelerometer, respectively, to compute the difference between said squares for each axis, respectively;
three buffers, one for each axis, for receiving said respective differences between said squares, and for outputting to produce said inverse of a squared sum;
a bus buffer, for storing said output of said three buffers.

9. The apparatus of claim 8, wherein said synchronizing circuit comprises:
a phase adjust circuit, for trimming said count signals and outputting a timing signal;
means for receiving a clock signal;
a first D flip-flop for receiving said timing signal, for inputting said clock signal and for outputting Q and $\overline{Q}$ signals;
a second D flip-flop for receiving said timing signal, for receiving said output Q signal as an input and for outputting a second Q signal;
an AND gate, for combining said $\overline{Q}$ signal with said second Q signal and said timing signal to produce a trigger signal.

10. The apparatus of claim 9, wherein said means for determining said change in said count signals comprises:

a first buffer, for receiving said first count from said phase lock loop;
an invertor for inverting said first count signal;
a second buffer for storing said inverted first count signal upon receipt of said trigger signal, while said subsequent count signal is received by said first buffer;
an adder for combining said inverted first count with said second count to produce a difference;
means for adding two most significant bits to said difference to produce a sum;
a third buffer for storing said sum upon receipt of said trigger signal until said clock signal permits outputting said sum.

11. The apparatus of claim 10, wherein control circuit further comprises:
a timing circuit for sequentially sending clock signals to said synchronizing circuits comprising:
a means for producing clock signals;
a divide by 16 counter for incrementally reducing said clock signals;
a multiplexer for receiving three incrementally reduced clock signals and sequentially outputting clock signals to said synchronizing circuits.

12. The apparatus of claim 11, wherein said control circuit further comprises:
a synchronizing circuit for sampling said bus buffer to obtain said difference between said squares for each of said axes, comprising:
a comparator, for receiving four incremental outputs from said divide by 16 counter, for receiving a designation of one of said three axes and for outputting a control timing signal;
means for producing query and enable signals;
an AND gate for combining said query and enable signals;
a first control D flip-flop for receiving said control timing signal as a clock signal and said combined query and enable signals as the input signal and for outputting control Q and $\overline{Q}$ signals, said control $\overline{Q}$ signal for loading said bus buffer;
a second control D flip-flop for receiving said control timing signal as a clock signal and for receiving said combined enable and query signals and said control Q signal as inputs, and for outputting a second control $\overline{Q}$ signal;
an AND gate for combining said second control $\overline{Q}$ signal with said first control Q signal to produce a combined signal;
a second AND gate for combining said combined signal with said control timing signal to produce a control trigger signal for sampling said bus buffer.

13. The apparatus of claim 12 wherein said means for scaling and biasing and said means for designating axes to said comparator comprise: a computer.

14. A method for analyzing a pair of frequencies which are related to natural frequency as a function of force applied to a system, said system including means producing a first frequency ($f_1$) and a second frequency ($f_2$), comprising the steps of:
sensing said first frequency ($f_1$) and said second frequency ($f_2$);
squaring said first and second frequencies to produce $f_1^2$ and $f_2^2$, respectively;
computing the difference between said squared frequencies ($f_1^2 - f_2^2$) to approximate $$\int_{t1}^{t2} (\Sigma f \cdot \Delta f) dt$$

to obtain a measure of the force applied to the system;

including the step of scaling and biasing $(f_1^2 - f_2^2)$ in accordance with the relationship of $[(f_1^2 - f_2^2)/B] + [(-A/B)]$, where A is said bias, and B is said scale factor;

said producing said first and said second frequencies comprising:

vibrating a first mass and a second mass, respectively, to produce said first and said second frequencies; and orienting said masses such that moving the system will cause an increase in one said frequency and a decrease in said other said frequency.

15. The method of claim 14, wherein said step of sensing said first and said said second frequency each comprise:

producing a count of the number of phase cycles in said frequency which occur within a specified time with a phase counter-circuit.

16. The method of claim 15, wherein said step of squaring said frequencies, together with said step of computing said difference between said squared frequencies, comprises:

receiving said count from each phase counter-circuit;

squaring each said count and subtracting said first squared count from said second squared count to produce said difference between said squared frequencies in a control circuit.

17. The method of claim 16, wherein step of producing a count in a phase counter-circuit comprises:

converting said frequency into square waves in a comparator;

counting square waves and outputting an initial count signal and a subsequent count signal, with a phase locked loop comprising:

an exclusive OR gate, a filter and shaping amplifier, a voltage controlled oscillator and a divide by 1024 counter;

a synchronizing circuit for coordinating clock signals with said count signals; and means for determining the difference between said initial count and said subsequent count, to produce said count.

18. The method of claim 17, wherein said the difference between said squared frequencies $(f_1^2 - f_2^2)$ is computed at a rate of at least the highest Nyquist frequency for the highest frequency of the means producing said frequencies.

19. The method of claim 18, wherein the means producing said first and said second frequencies comprises: a vibrating beam accelerometer.

20. The method of claim 19, further comprising:

two additional of the methods of claim 19, the three methods for performing X axis, Y axis and Z axis analysis respectively, wherein said accelerometers are aligned to correspond to movement along the X, Y and Z axes.

21. The method of claim 20 wherein said step of squaring said frequencies, together with said step of computing said differences between said squared frequencies, comprises:

squaring, in a multiplier, said count;

combining, in an adder, said squared count for one beam of said vibrating beam accelerometer with the inverse of a squared sum from a second beam of said vibrating beam accelerometer, for each axis, respectively, to compute the difference between said squares for each axis, respectively;

receiving said respective difference between said squares, and outputting to produce said inverse of a squared sum with three buffers, one for each axis;

storing, in a bus buffer, said output of said three buffers.

22. The method of claim 21, wherein said step of synchronizing comprises:

trimming said count signals and outputting a timing signal, in a phase adjust circuit;

receiving a clock signal;

receiving said timing signal, for inputting said clock signal and for outputting Q and $\overline{Q}$ signals with a first D flip-flop;

receiving said timing signal, for receiving said output Q signal as an input and for outputting a second Q signal with a second D flip-flop;

combining said $\overline{Q}$ signal with said second Q signal and said timing signal to produce a tigger signal, with an AND gate.

23. The method of claim 22, wherein said determining said change in said count signals comprises:

receiving said first count signal from said phase lock loop, in a first buffer;

inverting said first count signal in an inverter;

storing in a second buffer said inverted first count signal upon receipt of said trigger signal, while receiving said subsequent count signal in said first buffer;

combining, in an adder, said inverted first count with said second count to produce a difference; adding two most significant bits to said difference to produce a sum;

storing said sum in a third buffer upon receiving said trigger signal until said clock signal permits outputting said sum.

24. The method of claim 23, wherein said control circuit further comprises:

a timing circuit for sequentially sending clock signals to said synchronizing circuits comprising:

a means for producing clock signals;

a divide by 16 counter for incrementally reducing said clock signals;

a multiplexer for receiving three incrementally reduced clock signals and sequentially outputting clock signals to said synchronizing circuits.

25. The method of claim 24, wherein said control circuit further comprises:

a synchronizing circuit for sampling said bus buffer to obtain said difference between said squares for each of said axes, comprising:

a comparator, for receiving four incremental outputs from said divide by 16 counter, for receiving a designation of one of said three axes and for outputting a control timing signal;

means for producing query and enable signals;

an AND gate for combining said query and enable signals;

a first control D flip-flop for receiving said control timing signal as a clock signal and said combined query and enable signals as the input signal and for outputting control Q and $\overline{Q}$ signals, said control $\overline{Q}$ signal for loading said bus buffer;

a second control D flip-flop for receiving said control timing signal as a clock signal and for receiving said combined enable and query signals and said control Q signal as inputs, and for outputting a second control $\overline{Q}$ signal;

an AND gate for combining said second control $\overline{Q}$ signal with said fist control Q signal to produce a combined signal;

a second AND gate for combining said combined signal with said control timing signal to produce a control trigger signal for sampling said bus buffer.

26. The method of claim 25 wherein said scaling and biasing and said designating axes to said comparator is performed by a computer.

* * * * *